INVENTOR.
Edmund O. Schweitzer, Jr.,
BY
Robert R. Lockwood
Atty

COMMUNICATION SYSTEM

Original Filed April 6, 1956 4 Sheets-Sheet 2

INVENTOR.
Edmund O. Schweitzer, Jr.,
BY
Robert R. Lockwood
Att'y.

Oct. 31, 1961 E. O. SCHWEITZER, JR 3,007,042

COMMUNICATION SYSTEM

Original Filed April 6, 1956 4 Sheets-Sheet 3

INVENTOR.

Edmund O. Schweitzer, Jr.,

BY

Robert R. Lockwood

Atty.

COMMUNICATION SYSTEM

Original Filed April 6, 1956 4 Sheets-Sheet 4

INVENTOR.
Edmund O Schweitzer, Jr.,
BY
Robert R. Lockwood
Atty.

United States Patent Office 3,007,042

Patented Oct. 31, 1961

3,007,042

COMMUNICATION SYSTEM

Edmund O. Schweitzer, Jr., 1002 Dundee Road, Northbrook, Ill.

Original application Apr. 6, 1956, Ser. No. 576,564. Divided and this application Aug. 13, 1959, Ser. No. 833,624

23 Claims. (Cl. 250—6)

This invention relates generally to wave transmitting systems and it has particular relation to the transmission of sound waves. This application is a division of application Serial No. 576,564 filed April 6, 1956, which is a continuation-in-part of application Serial No. 466,480, filed November 3, 1954 and of application Serial No. 485,927, filed February 3, 1955, both now being abandoned.

This invention can be employed in communication systems such as telephone and radio systems for transmitting waves in order to reproduce sound waves or speech. At the present time only a single voice channel is available at a given carrier frequency. For example, over a simple telephone circuit employing no carrier frequencies, only a single voice channel is provided. Where carrier frequencies are employed, only one conversation can be carried on for each carrier frequency. Likewise, in radio transmission, only a single voice channel is available for each transmitting frequency. When the present invention is employed, a number of paths is provided for each single channel. That is, where only a single voice communication channel was previously available for telephone communication (a single circuit or a carrier frequency circuit for a long distance land circuit or under water cable circuit), or for radio broadcasting (the transmitting frequency of the station could be modulated by only a single program), when the present invention is used, a number of control and voice paths is available for each previous single channel. To illustrate, instead of broadcasting a single program over a given radio transmitting frequency, a number of programs can be transmitted over this given frequency. They can be segregated into control, voice and music programs, recognizing that control functions can be carried out at low frequencies, that the speaking voice requires a relatively narrow range of frequencies and that music encompasses the entire frequency range to which the ear is sensitive. Thus, it is possible to expand the use of the present communications channels without increasing their number or to decrease the number of carrier channels and increase the number of paths.

Among other objects of this invention are: To convert waves, such as sound waves, into a composite wave the shape of which is a function of certain variable characteristics of the waves; to shift the relative phase relationship between single and double frequency alternating currents as a function of the amplitude and frequency of the waves; to effect the phase shift by moving an armature under the control of the waves to be transmitted in a magnetic field generated by one of the frequencies; to generate a unidirectional field by combining the single and double frequency currents the position of which field shifts as a function of the amplitude and frequency of the sound waves; to employ either a rotary or a translatory movement for reconverting the composite wave into waves corresponding to the transmitted waves; to transmit a plurality of programs, i.e., control, voice, music, etc., over a single communication channel; and to accomplish this by modulating one or the other of a pair of frequencies bearing a fixed relation to each other and employing a plurality of sets of such frequencies, the sets being separated from each other through an extent sufficient to permit segregation thereof by suitable filter circuits.

Other objects of this invention will, in part, be obvious and in part appear hereinafter.

This invention is disclosed in the embodiments thereof shown in the accompanying drawings and it comprises the features of construction, combination of elements, arrangement of parts, and methods of operation which will be exemplified in the constructions, systems and methods hereinafter set forth and the scope of the application of which will be indicated in the appended claims.

For a more complete understanding of the nature and scope of this invention reference can be had to the following detailed description, taken together with the accompanying drawings, in which.

Figure 11:
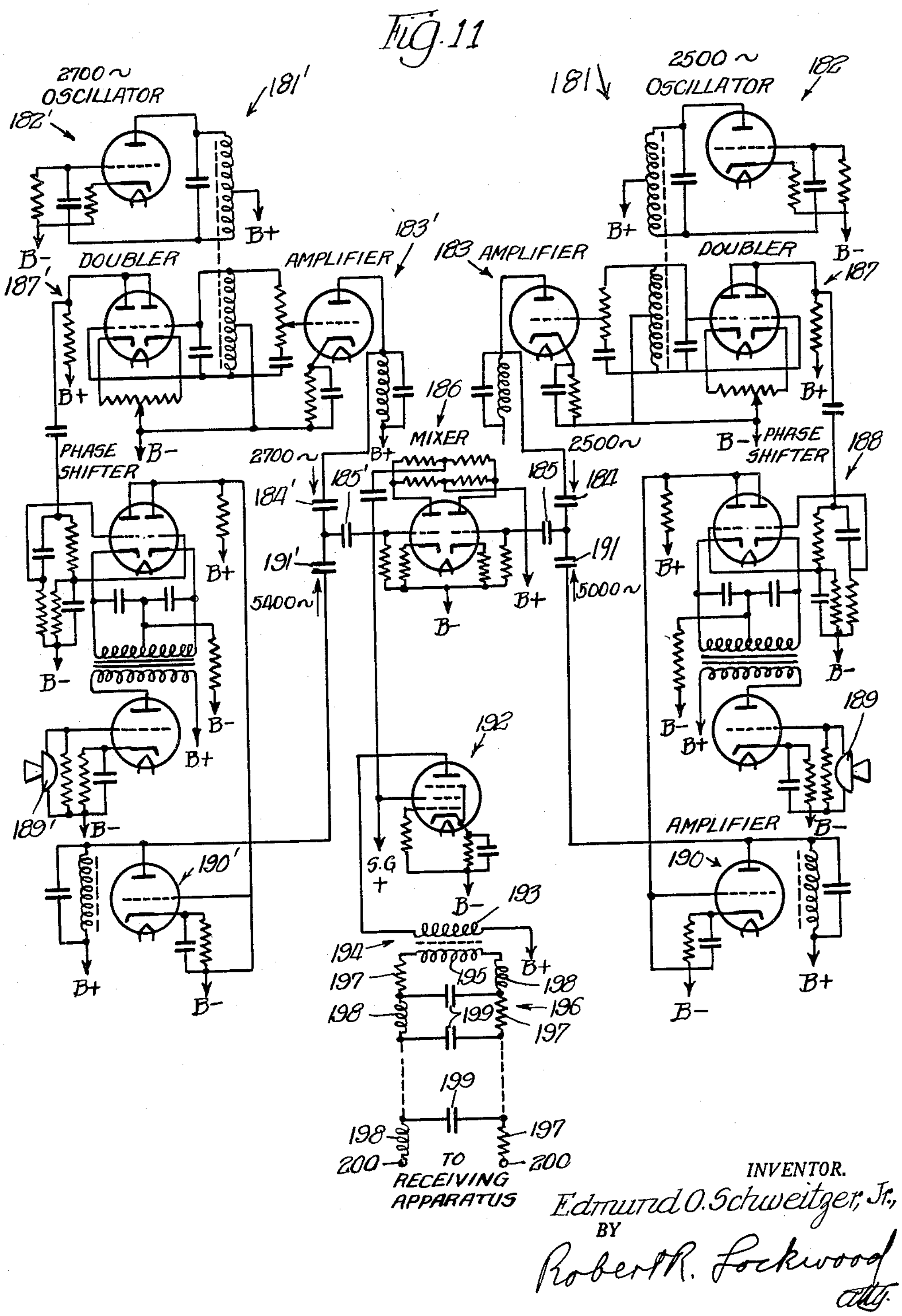
Figure 12:
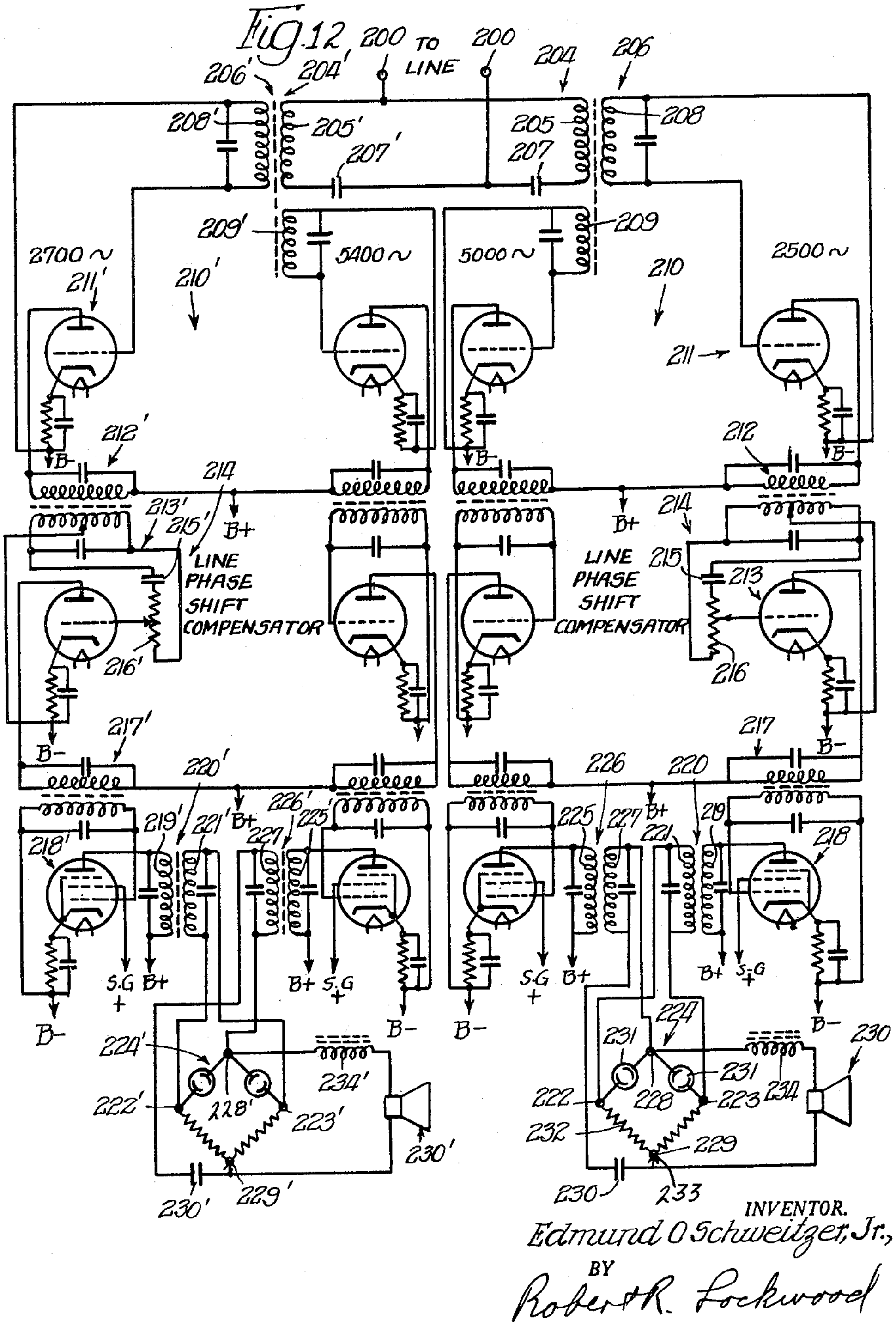

FIGURE 11 illustrates diagrammatically the circuits that can be employed to provide two paths along a channel for transmitting sound waves therealong, the illustration being in connection with a communication circuit which may be an overland and underwater cable; and FIGURE 12 shows diagrammatically the circuits that can be used at the receiving end of the line shown in FIGURE 11, it being understood that instead of the conducting circuit between the transmitting and receiving ends, a radio link can be employed.

Figures 1, 3, 4:
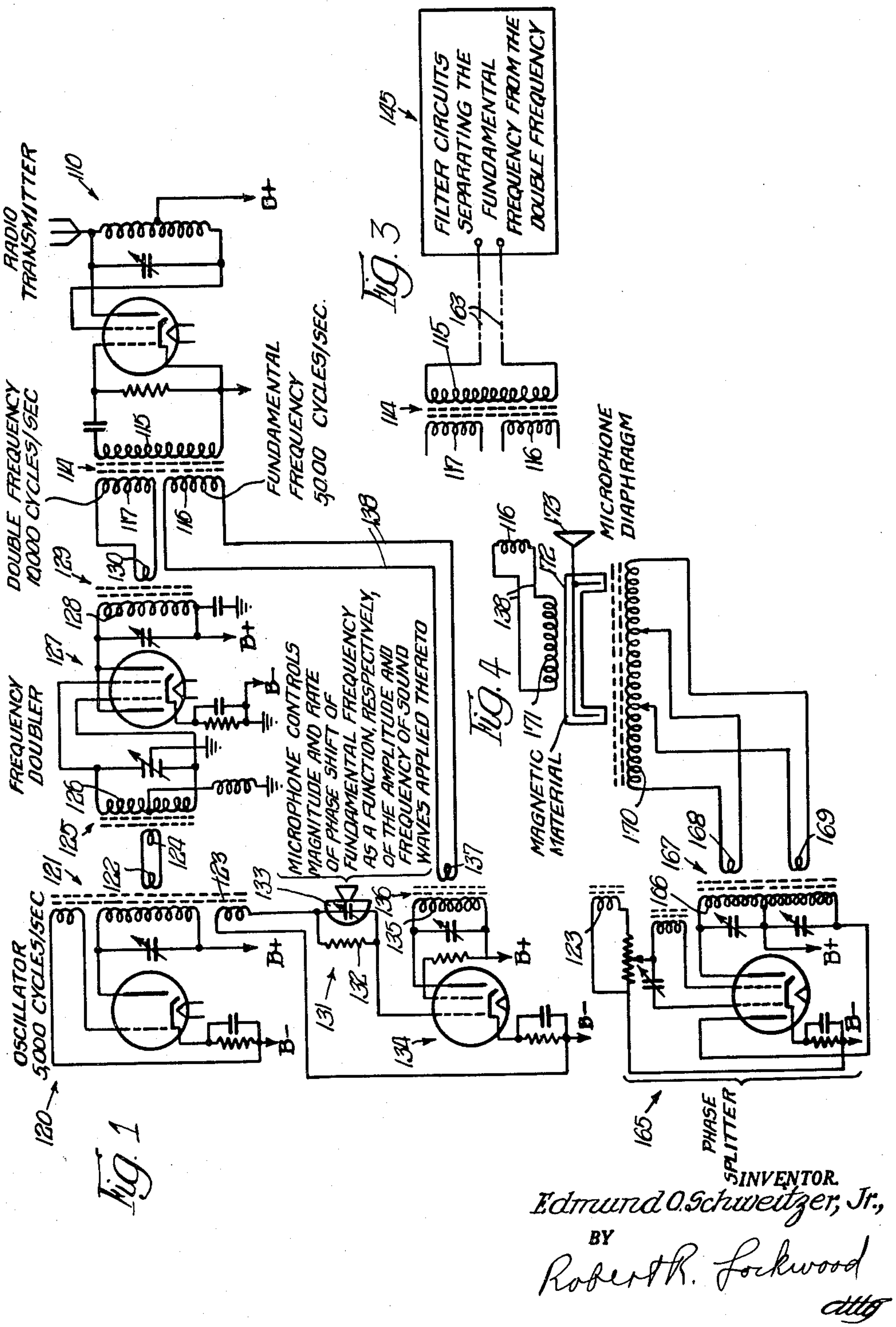
FIGURE 1 illustrates diagrammatically the control and transmitting means that can be employed in practicing this invention for voice transmission.
FIGURE 3 illustrates diagrammatically how the apparatus shown in FIGURES 1 and 2 can be interconnected by a conductive circuit rather than through radio transmitting and receiving means.
FIGURE 4 illustrates digrammatically a modified form of transmitting control means for use alternatively in the circuit connections illustrated in FIGURE 1.
Figures 2, 5, 6, 7, 8, 9, 10:
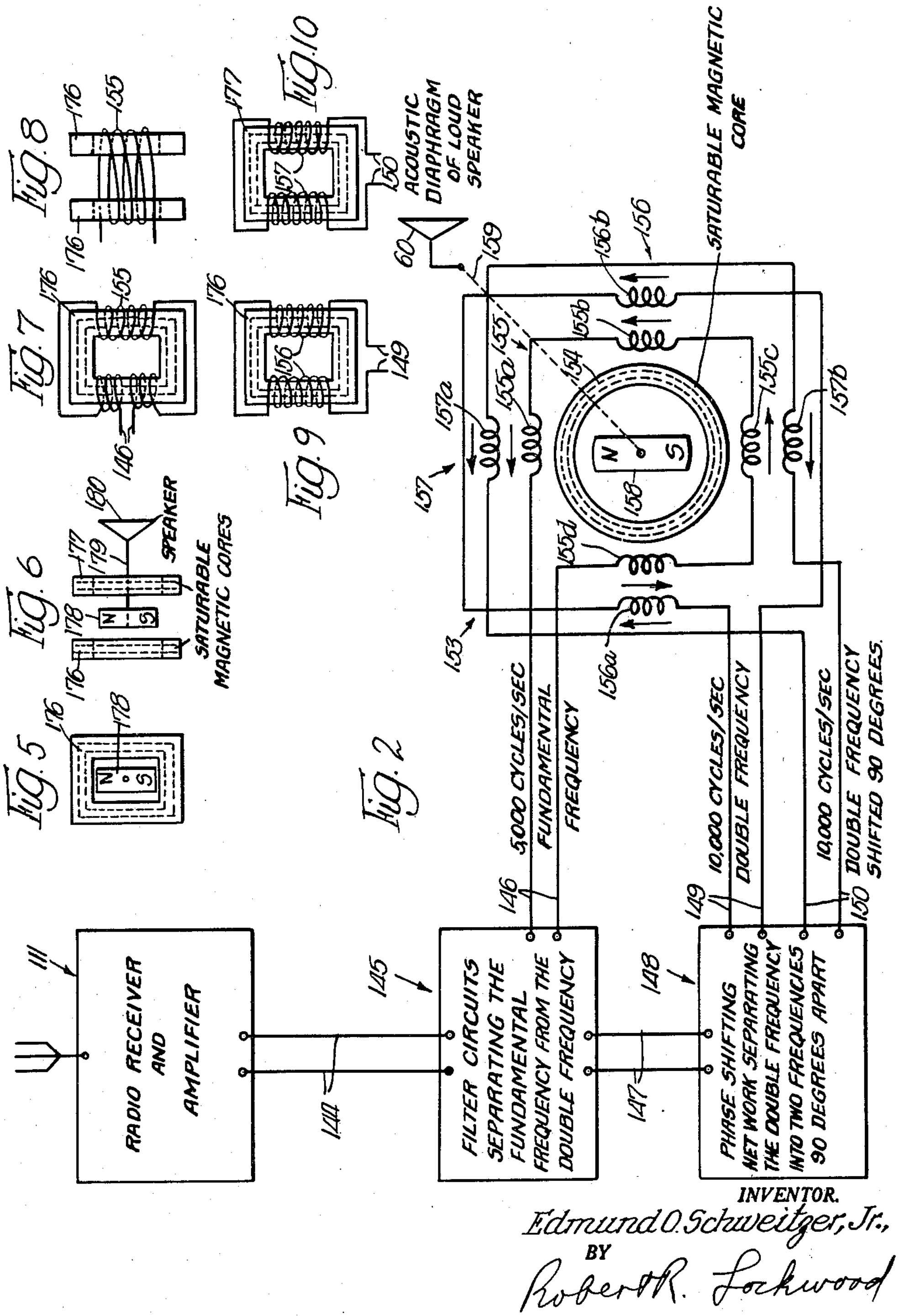
FIGURE 2 illustrates diagrammatically the receiving and control apparatus that can be used in conjunction with the apparatus shown in FIGURE 1 for practicing this invention.
FIGURE 5 is a view, in front elevation, of a modified form of transducer for use in lieu of the transducer illustrated in FIGURE 2.
FIGURE 6 is a view, in side elevation, of the transducer shown in FIGURE 5.
FIGURE 7 is a view, in side elevation, of the magnetic circuit for the transducer shown in FIGURES 5 and 6 and illustrating how the first winding which is common to both cores thereof is wound thereon.
FIGURE 8 is a view, in side elevation, of the cores for the transducer illustrated in FIGURE 7 and showing how the first winding is commonly applied to both cores.
FIGURE 9 is a view, in front elevation, of one of the cores for the transducer showing how the second winding which is individual thereto is wound thereon.
FIGURE 10 is a view, in side elevation, of the other core showing how the third winding which is individual thereto is wound thereon.

Referring now to FIGURES 1 and 2 of the drawings, it will be observed that the reference character 110 designates, generally, a radio transmitter and that the reference character 111 designates, generally, a radio receiver and amplifier. The radio transmitter 110 is of conventional construction and can be employed for transmitting at any of the usual broadcast frequencies. Likewise the radio receiver and amplifier 111 is of conventional construction. Obviously these devices can assume any well known form and shape as may be desired, the important feature being that it be possible to transmit waves from one point to another and to receive them in the manner herein described.

The radio transmitter 110 can be modulated by means of a transformer, shown generally at 114, having a winding 115 that is connected, as shown to one of the grids of the transmitter 110. Primary windings 116 and 117 are provided in the transformer 110 and are inductively related to the secondary winding 115. As will appear hereinafter a frequency of 5,000 cycles per second can be applied to the primary winding 116 while double that frequency or 10,000 cycles per second are applied to the primary winding 117. The frequencies just mentioned have been selected for illustrative purposes, it being understood that other frequencies can be employed. The criterion to be used, however, is that one of the frequencies is double that of the other or bears a fixed relation to the other as described hereinbefore.

In order to generate the single frequency, an oscillator, shown generally at 120, can be employed. It is of conventional construction and for the particular application here shown it is adjusted to generate a frequency of 5,000 cycles per second. Associated with the oscillator 120 is a transformer that is shown, generally, at 121 and has a secondary winding 122 and another secondary winding 123. The secondary winding 122 is connected, as shown, to a primary winding 124 of a transformer shown, generally, at 125 having a secondary winding 126 which is arranged to control the operation of a frequency doubler that is shown, generally, at 127. Under the conditions herein described the frequency doubler 127 acts to double the frequency generated by the oscillator 120. The frequency doubler 127 feeds through a primary winding 128 of a transformer shown, generally, at 129 having a secondary winding 130 which is connected, as shown, to the primary winding 117. In this manner a frequency double that generated by the oscillator 120 is applied to the transformer 114 and the radio transmitter 110 is correspondingly modulated.

It is desired in accordance with this invention to shift the phase relation between the single frequency and the double frequency, i.e., the phase relationship between the 5,000 cycle frequency and the 10,000 cycle frequency. This phase shift is effected in accordance with this invention by means of a phase shifting circuit shown, generally, at 131 and comprising a resistor 132 having a variable capacitance microphone 133 in shunt circuit relation therewith. As indicated in FIGURE 1 of the drawings the microphone 133 controls the magnitude and rate of phase shift of the fundamental or 5,000 cycle frequency as a function, respectively, of the amplitude and frequency of the sound waves applied thereto.

The output of the secondary winding 123, as controlled by the phase shifting circuit 131, is amplified by a suitable amplifier 134 which has associated therewith a primary winding 135 of a transformer shown, generally, at 136. The secondary winding 137 of the transformer 136 is connected by conductors 138 to energize the primary winding 116 of the transformer 114.

Now it will be understood that the radio transmitter 110 is modulated not only by the double frequency applied to the primary winding 117 but also that it is modulated by the single frequency which is applied to the primary winding 116. The phase relationship between these currents is shifted, as described, by the phase shifting circuit 131 under the control of the microphone 133 which, in turn, is controlled by the application of sound waves thereto.

In order to demonstrate the relationship between the frequencies applied to the primary windings 116 and 117 attention is directed to the curves shown in FIGURE 3 of the drawings forming a part of application Serial No. 576,564. Here the reference character 52 designates the single or fundamental frequency, previously described, which may be one full wave of the oscillator 120 which, as indicated in FIGURE 1, operates at a frequency of 5,000 cycles per second. The double frequency applied to the primary winding 117 is indicated by the curve 53. The phase relationship between the curves 52 and 53 is shifted by the phase shifting circuit 131 to effect, at the location where the radio receiver and amplifier 111 is operating, a reconversion of the sound waves into sound waves for reception thereof. Thus the radio transmitter 110 is modulated by a combination of the frequencies represented by the curves 52 and 53 with the phase relationship being shifted as a function of the amplitude and frequency of the sound waves applied to the microphone 133.

It was pointed out above that FIGURE 3 of application Serial No. 576,564 shows another double frequency current by the wave 54 which is shifted in phase relationship with respect to the wave represented by the curve 53 through 90°. This relationship between the currents represented by the curves 53 and 54 remains constant. However, only the fundamental frequency represented by the curve 52 and the double frequency represented by the curve 53 are employed for modulating the radio transmitter 110. The 90° shifted double frequency represented by the curve 54 is employed at the radio receiver and amplifier 111 in connection with the reconversion of the transmitted wave into sound waves in a manner to be described hereinafter.

The radio receiver and amplifier 111 is connected, as shown in FIGURE 2, by conductors 144 to filter circuits, shown generally at 145, which are designed to separate the fundamental frequency represented by the curve 52 from the double frequency represented by the curve 53. Of course these filter circuits can be incorporated in the radio receiver and amplifier 111. However, they are illustrated separately in order to call attention to their function. The fundamental frequency, in this particular instance a frequency of 5,000 cycles per second, is transmitted from the filter circuits 145 over conductors 146 while the double frequency, in this instance a frequency of 10,000 cycles per second, is carried by conductors 147 to a phase shifting network, shown generally at 148, which functions to separate the double frequency into two frequencies 90° apart. For this purpose the circuit connections, generally as illustrated in FIGURE 2, and to be described hereinafter, can be employed. The output of the phase shifting network 148 is then applied to the conductors 149 and 150.

Now it will be understood that the fundamental or single frequency, represented by the curve 52, is applied to the conductors 146 and that one of the double frequencies, represented by the curve 53, is applied to the conductors 149 while the other double frequency, represented by the curve 54 and shifted 90° away from the frequency represented by the curve 53, is applied to the conductors 150.

As shown in FIGURE 2 these conductors are arranged to energize a dynamo electric device or a transducer that is shown, generally, at 153, which is similar to the dynamo electric device 66, previously described in application Serial No. 576,564. This device comprises an annular saturable magnetic core 154 which preferably is formed of powdered iron as shown. A first winding 155 is provided on the core 154 and it is connected for energization to the conductors 146. The winding 155 may be distributed around the core 154 or it can be subdivided into four concentrated windings indicated at 155*a*, 155*b*, 155*c* and 155*d*. As indicated by the arrows associated with each of these winding sections, they are connected in such manner as to generate flux and induce the same in the same direction in the core 154.

A second winding 156 is provided on the core 154 and is connected for energization to the conductors 149. The winding 156 can be distributed around the core 154 or it can be wound in two concentrated sections as indicated at 156*a* and 156*b*. As indicated by the arrows associated with these windings they are connected so that the same current flowing therethrough induces magnetic flux in the core 154 in opposite directions.

A third winding 157 is provided on the core 154 and it is connected for energization to the conductors 150. Like the winding 156 it can be distributed around the core 154 or it can be arranged in two sections as indicated at 157*a* and 157*b*. As indicated by the arrows associated with these windings, they are connected in such manner as to induce flux into the saturable magnetic core 154 in opposite directions.

It will be understood that the application of the single frequency for energizing the first winding 155, while the windings 156 and 157 are energized, respectively, with double frequency currents in 90° time phase relationship, generates a unidirectional field which remains fixed in space as long as there is no relative phase shift between the fundamental frequency and the two double frequencies. There is a shift in the position in this unidirectional field where there is a shift in the relative phase relationship between the fundamental frequency and the double frequencies. In accordance with this invention this phase shift is effected by changing the position of the fundamental frequency, i.e., the curve 52 with respect to the double frequencies represented by the curves 53 and 54 by means of the variable capacitance microphone 133, FIGURE 1. Thus the sound waves applied to the microphone 133 are converted in the manner and by the means described into a shifting magnetic field that is unidirectional in character. It then remains to provide means responsive to the shifting unidirectional field for converting it into sound waves.

For this purpose a permanent magnet armature 158 is employed and it is positioned within the core 154 as shown in FIGURE 2. It will be understood that the permanent magnet armature 158 does not rotate but rather it oscillates in accordance with the shifting position of the unidirectional field in which it is placed. The armature 158 is mounted on a shaft 159 which translates the movement of the armature 158 and applies the same to an acoustic diaphragm 160 of a loud speaker. In this manner the sound waves applied to the microphone 133 are reconverted into sound waves emitted by the diaphragm 160.

While the apparatus illustrated in FIGURE 1 has been shown and described as being connected to the apparatus shown in FIGURE 2 through a link which is provided by radio transmitting and receiving means, it will be understood, as previously described, that a direct wire link can be employed if desired. As shown in FIGURE 3 conductors 163 are illustrated as interconnecting the secondary winding 115 of the transformer 114 to the filter circuits 145. Using a direct connection as here shown it is unnecessary to modulate a radio carrier frequency and then to demodulate it in receiving apparatus.

In FIGURE 4 of the drawings there is illustrated a modification of a portion of the system shown in FIGURE 1. The apparatus here shown can be employed in lieu of that shown and described for FIGURE 1.

In FIGURE 4 the secondary winding 123 of the transformer 121 is connected to a phase splitter which is shown, generally, at 165. As indicated above, such a phase splitter can be employed in the phase shifting network 148 for separating the double frequency into two frequencies in 90° time phase relation. Associated with the phase splitter 165 is a primary winding 166 of a transformer shown, generally, at 167 having two secondary windings 168 and 169 into which the fundamental frequency from the oscillator 120 is induced so as to provide two fundamental frequencies in 90° time phase relationship. The outputs of the secondary windings 168 and 169 are applied to a winding 170 which is inductively related to a winding 171 that is connected by the conductors 138 to the secondary winding 116 of the transformer 114. Interposed between the windings 170 and 171 is an armature 172 the position of which is controlled by sound waves applied to a microphone diaphragm 173. The movement of the armature 172 by the sound waves applied to microphone diaphragm 173 shifts the position of the fundamental frequency represented by the curve 52 with respect to the double frequency represented by the curve 53 in FIGURE 3 of application Serial No. 576,564. This phase shift is a function of the amplitude and frequency of the applied sound waves.

It will be understood that the circuit illustrated in FIGURE 1, modified by the circuit connections shown in FIGURE 4, is operable for use in conjunction with the circuits as shown in FIGURE 2 to reconvert the relatively phase shifted fundamental and double frequencies into sound waves which are emitted by the diaphragm 160.

In FIGURES 5 to 10 of the drawings there is illustrated a modified form of the dynamo electric device or transducer 153. It will be observed that, instead of the annular magnetic core 154 previously described, two rectangular saturable cores 176 and 177 are employed. Preferably they are formed of powdered iron. As shown in FIGURE 6 the cores 176 and 177 are positioned in parallel spaced relation with a permanent magnet armature 178 interposed therebetween. It is connected by a rod 179 to a cone type speaker 180. The permanent magnet armature 178 moves toward and away from the cores 176 and 177 depending upon the energization thereof by the windings 155, 156, 157 which windings are the same windings employed for energizing the transducer 153 as shown in FIGURE 2.

In order to illustrate more clearly the arrangement of the windings 155, 156 and 157 the application thereof to the cores 176 and 177 is shown individually.

In FIGURES 7 and 8 it will be observed that the winding 155 to which the fundamental frequency is applied is common to the longer legs of both of the cores 176 and 177. The turns are applied, as previously described, so that the magnetic flux induced by current flowing through the winding 155 is in the same direction throughout the cores 176 and 177.

In FIGURE 9 it will be observed that the winding 156 is applied only to the core 176. It is wound on the longer legs of this core and one half of the winding is arranged to induce magnetic flux into the core 176 in one direction while the other half is arranged to induce magnetic flux in the opposite direction.

In a similar manner FIGURE 10 shows the application of the windings 157 to the other magnetic core 177. It will be observed that one half of this winding is applied to one of the longer legs and is arranged to induce magnetic flux in a direction opposite to that induced by the other half of the winding on the other longer leg.

Referring again to FIGURES 1 and 4 of the drawings, it is pointed out that the microphone 133 and the phase shifting circuit 131 or the microphone 173 and the phase splitter 165 can operate on the double frequency from the frequency doubler 127 to shift its phase relative to the fundamental frequency from the oscillator 120 as a function of the amplitude and frequency of the sound waves to be transmitted.

From a consideration of the foregoing description and of FIGURES 1–12 of the drawings, it will be apparent that the number of communication paths over a single channel is limited only by the frequency spacing that is required to avoid interference and is required for proper functioning of the filter circuits to be described. Thus a large number of paths is available for communication purposes and the existing facilities for such purposes can be greatly expanded.

For control purposes sets of frequencies, such as 15 and 30 cycles per second, 20 and 40 cycles per second, 25 and 50 cycles per second, etc., can be used. If only control functions are to be effected, a complete spectrum of such pairs of frequencies can be utilized over a single channel with the frequencies being relatively closely spaced because of the substantially insignificant side bands as previously pointed out. Such a single path can be either a pair of metallic conductors, a carrier frequency for a telephone cable, or a carrier frequency of a radio transmitter. Of course it also includes the carrier frequency that may be applied to a transmission line as is well known.

Where speech or music are to be transmitted, preferably higher frequencies are employed. In FIGURES 1 and 2 of the drawings the frequencies of 5,000 and 10,000 cycles per second are suggested as providing one path over a given channel. Another path over the same channel can be provided by employing 5,100 and 10,200 cycles per second. Likewise paths can be provided using 4,900 and 9,800 cycles per second. It will be shown hereinafter that frequencies of the order of 2,500 and 2,700 cycles per second can be employed, these being about the lowest that are practicable for voice transmission when it is assumed that the maximum frequency to be transmitted is 2,000 cycles per second. Thus a large number of paths are provided over a single channel. It will now be obvious that instead of limiting a single channel to a single path, as is conventional for a radio transmitter operating at a fixed carrier frequency or a telephone cable operating at a fixed carrier frequency, it is possible, by using the present invention, to expand the use of a single channel and use it for transmitting a large number of radio programs, for example, or to carry on a large number of telephone conversations. An even greater number of paths is provided for control purposes where the rate of phase shift of one frequency with respect to the other for a particular path is relatively small. While the number of paths per channel is not unlimited, it is greatly in excess of the single path that heretofore has been available.

When radio transmission is employed, it is feasible to communicate between two stations by generating at one station a fundamental frequency of, say, 5,000 cycles per second and then doubling it to provide a second harmonic the phase of which can be shifted with respect to the fundamental. The composite wave then is employed to modulate the carrier frequency of the one station for receipt by the other station. At the latter the fundamental can be filtered out and employed to generate a second harmonic which is free of the phase shift at the one station and which can be shifted relative to the first harmonic. The resulting composite wave then can be used to modulate the carrier frequency of the other station for transmission to the first station, the carrier frequencies of the stations being different. This permits the station where the fundamental frequency is generated to control the transmission from both stations.

Referring now particularly to FIGURE 11 of the drawings, it will be observed that transmitting equipment illustrated, generally, at 181 and 181′ is illustrated for providing two paths along a channel for simultaneous communication therealong. The equipment for each path is identical and there is certain common equipment. For illustrative purposes it is pointed out that the transmitting equipment 181 is arranged to operate using an oscillator 182 that generates a frequency of 2,500 cycles per second while the transmitting equipment 181′ employs an oscillator 182′ that is tuned to generate a frequency of 2,700 cycles. It has been found that if the fundamental frequencies are 200 cycles apart, it is possible to separate them at the receiving end without any difficulty. Using more efficient filtering equipment, it is possible to use frequencies closer than 200 cycles as will be understood readily.

The fundamental frequency from each of the oscillators 182 and 182′ is transferred inductively to amplifiers 183 and 183′ respectively and thence through capacitors 184 and 184′ and 185 and 185′ in series to the grids of a mixer 186 which is common to both of the sets of transmitting equipment 181 and 181′.

The outputs of the oscillators 182 and 182′ also are transferred inductively to doublers 187 and 187′ which, as will be understood, generate frequencies which are double those of their respective oscillators. The outputs of the doublers 187 and 187′ are applied to phase shifters 188 and 188′ which are controlled by voice frequencies applied to microphones 189 and 189′. It will be noted that each phase shifter circuit 188 and 188′ includes a double triode tube with the grids energized 90° apart by virtue of the phase shifter network comprising capacitors and resistors. The audio inputs from the microphones 189 and 189′ are applied to the cathodes of these tubes to change the cathode bias and thus change the balance of two currents which are 90° apart so that one predominates over the other as a function of the voice frequency. The outputs from the phase shifters 188 and 188′ are applied to amplifiers 190 and 190′ since it is desired that little current be withdrawn from the phase shifters 188 and 188′. It will be understood that the outputs of the amplifiers 190 and 190′ comprise frequencies which are double those generated by the oscillators 182 and 182′ and they are applied through capacitors 191 and 191′ and common capacitors 185 and 185′ to the mixer 186. The mixer 186 makes it possible to combine the outputs of the two sets of transmitting equipment 181 and 181′ in such manner that the one does not affect the other when applied to the output circuit.

The output of the mixer 186 which consists of the outputs of the two sets of transmitting equipment 181 and 181′ is amplified by amplifier 192 and then is applied to primary winding 193 of a transformer 194 having a secondary winding 195. The output of the secondary winding 195 can be applied to a radio transmitter for modulating its carrier frequency. For example, the secondary winding 195 can be substituted for the winding 15 of the transformer 14 which modulates the radio transmitter 10 in FIGURE 1 of the drawings.

However, in FIGURE 11 the secondary winding 195 is arranged to apply the output of the transformer 194 to a transmission line 196 which is indicated by resistors 197, inductors 198 and capacitors 199. The line 196 may be of any desired length. For example, it may be a coaxial cable and may have a length of several hundreds of miles.

The extent of the phase shift of the 5,000 cycle current with respect to the 2,500 cycle current for the transmitting equipment 181 is of the order of 5° under the control of the microphone 189. The extent of the phase shift determines the volume or loudness of the signal while the rate of phase shift is a function of the frequency of the applied signal. A phase advance at the rate of 360° per second is equivalent to a frequency increase of one cycle per second and conversely, if the phase is retarded at the rate of 360° per second, there is a frequency decrease of one cycle per second. When the 5,000 cycle current has its phase alternately advanced or retarded by a thousand cycle current, i.e., a middle range of voice frequency, through an angle of 50°, the phase of the 5,000 cycle current is changed at the rate of 5° per 2,000 cycles or at the rate of 10,000° per second. Thus the frequency change is in the neighborhood of 28 cycles per second. This indicates the required band width for a thousand cycle tone. For a 2,000 cycle tone the band width is twice that or approximately 56 cycles. The maximum for voice frequency would be the required band width for transmitting the signal having a frequency of 5,000 cycles. If desired, a single side band transmission can be used in order to provide more paths along a channel.

It will be appreciated that it is unnecessary to use loading coils along the line 196 or to use repeater stations. The reason for this is that, instead of applying to the line 196 the entire voice frequency, each path is made up of only two frequencies and the phase of one is shifted with respect to the phase of the other as a function of the voice frequency. Any fixed phase shift which takes place between the frequencies as the result of the impedance of the line can be compensated for at either end. It will be shown hereinafter where compensation is provided at the receiving end. Thus no loading coils are required along the line 196. By applying a sufficient voltage to the secondary winding 195 corresponding to the impedance of the line 196 and employing suitable amplifying equipment at the receiving end, it is unnecessary to use repeater stations along the line 196.

The terminals of the line 196 are indicated at 200 and, as indicated in FIGURE 11, they are provided for connection to the receiving apparatus which is illustrated in FIGURE 12 to which reference now will be had.

As there illustrated the terminals 200 from the line 196 are connected to series resonant circuits 204 and 204′ each of which comprises a primary winding 205 and 205′ of a transformer 206 and 206′ and a capacitor 207 and 207′. The series resonant circuit 204 is tuned to series resonance with the line input of 2,500 cycles while the series resonant circuit 204′ is tuned to series resonance with the line input of 2,700 cycles. These series resonant circuits are respectively also tuned to the second harmonics of 5,000 cycles and 5,400 cycles. Secondary windings 208 and 208′ and 209 and 209′ are associated with the primary windings 205 and 205′ respectively and are arranged, as illustrated, to energize circuits tuned to and operating at the respective frequencies of 2,500 cycles and 5,000 cycles and 2,700 cycles and 5,400 cycles. These two pairs of frequencies are applied to respective sets of receiving equipment indicated generally at 210 and 210′. Since the receiving equipment for each of these frequencies is substantially identical, the receiving equipment for the 2,500 cycles and 2,700 cycles will be described in detail only.

The outputs of the transformers 206 and 206′ through the secondary windings 208 and 208′ are applied to amplifiers 211 and 211′. The amplifier 211, for example, is arranged to operate at a value near the threshold value of the tube for the purpose of reducing the amount of the 2,700 cycle signal that is amplified. Conversely the amplifier 211′ is similarly operated in order to reduce the amount of 2,500 cycle signal that is amplified. The outputs of these amplifiers are applied to transformers 212 and 212′ and thence to amplifiers 213 and 213′. The transformers 212 and 212′ and their associated circuits are tuned to filter out all frequencies except the frequencies which it is desired that shall be passed, i.e., 2,500 cycles for the transformer 212 and 2,700 cycles for the transformer 212′. The outputs of the transformers 212 and 212′ are fed to amplifiers 213 and 213′.

It will be recalled that there is a fixed phase shift between the fundamental and second harmonic as the result of the impedance of the line 196. This can be compensated for by means of the line phase shift compensator 214 associated with the amplifier 213 and a similar compensator 214′ associated with the amplifier 213′. It will be noted that the compensators are made up of capacitors 215 and 215′ and potentiometers 216 and 216′ connected in series and across the output of the respective transformers 212 and 212′, the potentiometers being connected to the grids of the respective amplifiers 213 and 213′. Once the compensator 214 or 214′ has been adjusted for the impedance of the line 196 at the particular frequency of the respective receiving equipment, it needs no further adjustment as long as the impedance remains constant.

The outputs of the amplifiers 213 and 213′ are applied to transformers 217 and 217′ which likewise are tuned to their respective frequencies and which frequencies constitute substantially only the signal that is passed therethrough and applied to power amplifiers 218 and 218′. The outputs of the power amplifier 218 and 218′ are applied to primary windings 219 and 219′ of coupling transformers 220 and 220′ having secondary windings 221 and 221′ that are connected to terminals 222 and 223 and 222′ and 223′, respectively, of bridge circuits that are indicated, generally, at 224 and 224′. The characteristics of these bridge circuits will be described presently.

As pointed out above similar amplifying and filter equipment is provided for receiving the 5,000 cycle and 5,400 cycle currents so that ultimately these currents are applied to primary windings 225 and 225′, respectively, of coupling transformers 226 and 226′ having secondary windings 227 and 227′ which are connected across terminals 228 and 229 of the bridge circuit 224 and across terminals 228′ and 229′ of the bridge circuit 224′ through capacitors 230 and 230′.

The functioning of the bridge circuits 224 and 224′ is such as to produce between the terminals 228 and 229 and 228′ and 229′ direct currents the magnitudes of which are functions of the rate and magnitude of the phase shift between the frequencies of the respective transmitting and receiving circuits. These varying direct currents are applied to a loud speaker or receiver 230 and 230′ for reproducing the sound waves that were applied, respectively, to the microphones 189 and 189′.

The bridge circuits 224 and 224′ are identical and description of one will suffice for both. Devices 231 are provided in a least two adjacent arms of the bridge 224 having non-linear current carrying characteristics with the terminal 228 to which the double frequency is applied being interposed therebetween. Devices having non-linear current carrying characteristics are neon tubes. Others are germanium diodes and thyrite varistors, such as silicon carbide resistor elements. Also, thermionic tubes can be used. As a matter of fact any device having a non-linear current carrying characteristic, either positive or negative, can be employed provided the device is sufficiently responsive for the frequency applied thereto in order to provide the converting characteristics that are required for changing the fundamental and second harmonics applied to the bridge to direct current. As will be pointed out hereinafter, where lower frequencies are applied to the bridge, it is possible to employ other devices such as tungsten filament lamps in lieu of the devices 231. However, tungsten is too slow in response for use at the higher frequencies.

While each of the arms of the bridge circuit 224 can have incorporated a device having non-linear current carrying characteristics therein, it is preferable in some cases to employ a potentiometer 232 for the other two arms and to provide a tap 233 which is adjustable to balance the bridge to eliminate the fundamental frequency in the output between the terminals 228 and 229. If the bridge is unbalanced, the 2,500 cycle frequency, for example, will provide a whistle in the loud speaker or receiver 230. Reactors 234 and 234′ are connected between the bridge circuits 224 and 224′ and the loud speakers or receivers 230 and 230′ to eliminate the second harmonic.

By employing the bridge circuit 224 which operates as a result of the interaction between the two frequencies, it is possible to obtain a varying direct current output which can be employed for operating the loud speaker or receiver 230. The capacitor 230 is provided for preventing the flow of direct current to the source of the double frequency and confining it solely to the circuit including the loud speaker or receiver 230.

The transmitting and receiving equipment shown in FIGURES 11 and 12 of the drawings can be used for application to cable circuits where presently carrier frequencies are employed to provide a number of channels. In certain instances these carrier frequencies extend from 20,000 to 164,000 cycles with each channel being separated by 4,000 cycles. It has been the practice in the past to modulate the carrier frequency for each channel in accordance with sound waves to be transmitted from one end of the cable to the other. It is possible using the present invention to provide a number of paths along each channel. However, instead of employing a separation of 4,000 cycles, a separation between channels of 20,000 cycles can be used. This would provide eight channels in the range between 20,000 and 164,000 cycles. Then along each of these channels there could be provided eight paths beginning with a frequency of 2,500 cycles and its double harmonic and increasing in steps of 200 cycles for each path until finally a fundamental frequency of 3,900 cycles and double harmonic of 7,800 cycles would be used. This would provide a total of 64 paths along the cable in contradistinction to the 36 channels that presently are available when the carrier frequencies range from 20,000 to 164,000 cycles.

In addition a large number of control frequencies in the lower ranges can be used to provide a large number of control paths in the carrier frequently range below 20,000 cycles.

It has been pointed out hereinbefore that the transmitting equipment shown in FIGURE 11 can be employed for modulating a radio transmitter. When such modulation is employed, it is desirable to operate radio stations at frequencies which are further apart than presently is permitted. For example operating frequencies of 600,000 cycles, 700,000 cycles and 800,000 cycles can be used. Then for each of these transmitting frequencies it would be possible to use frequencies up to 50,000 cycles per second for phase shifting purposes. Thus a frequency combination of 25,000 cycles and its second haromnic of 50,000 cycles could be used as a maximum and these frequencies could be reduced in steps of 200 and 400 cycles per second to give a large number of paths for each transmitting channel.

With reference to the bridge circuits as shown in FIGURE 12 which employ two or more devices having nonlinear current carrying characteristics it is possible, instead of varying the phase between the fundamental and the second harmonic to vary the magnitude of the second harmonic and thus vary correspondingly the direct current output. For example, the magnitude of the second harmonic can be varied as a function of the voice frequency.

Similarly the second harmonic for the system shown in FIGURES 1 and 2 of the drawings can be amplitude modulated and there will be a corresponding modulation of the unidirectional flux in the dynamo electric device 153.

Thus amplitude modulation of one of the two frequencies can be employed to provide another path along a channel in addition to the several paths previously described.

Since certain further changes, combinations and variations can be made in the foregoing system and method and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In a communication system the steps which comprise: transmitting from a first point to a remote point two alternating currents the frequency of one of which bears a fixed relation to that of the other, changing a variable characteristic of one of said currents with respect to the other as a function of the amplitude and frequency of sound waves to be transmitted, generating a unidirectional quantity at the remote point as the resultant of said alternating currents which varies as said function of the amplitude and frequency of said sound waves, and reproducing said waves in response to said varying quantity.

2. In a communication system the steps which comprise: transmitting from a first point to a remote point two alternating currents the frequency of one of which bears a fixed relation to that of the other, shifting the phase of one of said currents with respect to the phase of the other as a function of the amplitude and frequency of sound waves to be transmitted, generating a unidirectional quantity at the remote point as the resultant of said alternating currents which varies as said function of the amplitude and frequency of said sound waves, and reproducing said sound waves in response to said varying quantity.

3. The invention as set forth in claim 2 wherein the unidirectional quantity is a unidirectional magnetic field the position of which shifts as a function of the amplitude and frequency of the transmitted sound waves.

4. The invention as set forth in claim 2 wherein the unidirectional quantity is a unidirectional current the magnitude of which varies as a function of the amplitude and frequency of the transmitted sound waves.

5. Method of wave transmission with comprises: subjecting a magnetic member to an alternating flux and to a shifting alternating flux the frequency of which is twice that of said alternating flux, and shifting the phase relation between said fluxes as a function of the amplitude and frequency of the wave to be transmitted to effect a corresponding movement of said magnetic member and reproduce the wave.

6. Method of transmitting sound waves which comprises: transmitting two alternating currents the frequency of one of which is twice that of the other, shifting the phase relation of one of said currents with respect to the other as a function of the amplitude and frequency of the sound waves, generating a unidirectional field as the resultant of said alternating currents the position of which shifts as said function of the amplitude and frequency of said sound waves, and moving a sound producing member in accordance with the movement of said unidirectional field.

7. In a wave reproducing system, in combination, a magnetic core structure, means for inducing an alternating magnetic flux in said magnetic core structure, means for inducing a shifting alternating magnetic flux in said magnetic core structure having a frequency double that of the first mentioned alternating flux, the resultant of said fluxes being a unidirectional field, means for changing the phase relationship between said fluxes including a sound wave responsive member and a magnetic member movable in a magnetic field as a function of the amplitude and frequency of the sound waves to effect corresponding change in the position of said unidirectional field, and magnetic means responsive to said unidirectional field for reproducing said sound waves.

8. A wave transmitting system comprising, in combination, radio transmitting and receiving means, means for modulating said transmitting means with a first alternating current and with a second alternating current having double the frequency of said first alternating current, means for shifting the phase relationship between said first and second alternating currents as a function of the amplitude and frequency of waves to be transmitted, filter circuit means at said receiving means for separating said alternating currents, phase shifting means for splitting the double frequency alternating current into two alternating currents in quadrature with respect to each other, a magnetic core structure, a first winding means on said core structure connected to be energized by the first alternating current from said filter means to induce an alternating magnetic flux in said core structure, a second winding means on said core structure connected to be energized by said two alternating currents in quadrature to induce a shifting alternating magnetic flux in said core structure having a frequency double that of the first mentioned alternating flux, the resultant of said fluxes being a unidirectional field the position of which shifts in accordance with the degree of shift between said first and second alternating currents, and magnetic means responsive to said field for reproducing said transmitted waves.

9. The invention as set forth in claim 8 wherein the phase relationship between the first and second alternating currents is shifted by a microphone to which sound waves are applied and the magnetic means reproduces said sound waves.

10. In a wave reproducing system, in combination, means providing first, second and third alternating currents; said second and third alternating currents each being double the frequency of said first alternating current and said third alternating current being in quadrature with said second alternating current; a magnetic core, first, second and third windings inductively related to said core and connected to be energized respectively by said first, second and third alternating currents; said first winding inducing alternating magnetic flux in said core in the same direction throughout, said second and third windings each being arranged in two sections with a section of each inducing alternating magnetic flux in said core in a direction opposite to the direction of the other section, the resultant of said magnetic fluxes being a unidirectional field, movable magnetic means responsive to said unidirectional field, and means for shifting the relative phase relation of said first alternating current with respect to said second and third alternating currents as a function of the amplitude and frequency of the waves to be reproduced whereby the position of said unidirectional field is correspondingly shifted accompanied by like movement of said magnetic means for reproducing said waves.

11. The invention as set forth in claim 10 wherein the phase relation between the first alternating current and the second and third alternating currents is shifted by a microphone to which sound waves are applied and the magnetic means reproduces said sound waves.

12. In a wave reproducing system, in combination, a magnetic core structure, means for inducing an alternating magnetic flux in said magnetic core structure, means for inducing a shifting alternating magnetic flux in said magnetic core structure having a frequency double that of the first mentioned alternating flux, the resultant of said fluxes being a unidirectional field, means for changing the phase relationship between said fluxes as a function of the amplitude and frequency of the waves to be reproduced to effect corresponding change in the position of said unidirectional field, and magnetic means responsive to said field for reproducing said waves.

13. The invention as set forth in claim 12 wherein the phase relationship between said fluxes is shifted by a microphone to which sound waves are applied and the magnetic means reproduces said sound waves.

14. In a wave reproducing system, in combination, a magnetic core structure, means for inducing an alternating magnetic flux in said magnetic core structure including a winding thereon, means for inducing a shifting alternating magnetic flux in said magnetic core structure having a frequency double that of the first mentioned alternating flux including two windings one half of each of which is wound in one direction and the other half is wound in the opposite direction, the resultant of said fluxes being a unidirectional field, means for changing the phase relationship between said fluxes as a function of the amplitude and frequency of the waves to be reproduced, and magnetic means responsive to said field for reproducing said waves.

15. In a wave reproducing system, in combination, a magnetic core structure including a pair of magnetic circuits in parallel relation, means for inducing an alternating magnetic flux in said magnetic circuits including a winding common thereto, means for inducing a shifting alternating magnetic flux in said magnetic circuits having a frequency double that of the first mentioned alternating flux including a winding on each of said circuits one half of each of which is wound in one direction and the other half is wound in the opposite direction, the resultant of said fluxes being a unidirectional field, means for changing the phase relationship between said fluxes as a function of the amplitude and frequency of the waves to be reproduced, and magnetic means responsive to said field for reproducing said waves.

16. In a wave reproducing system, in combination, a magnetic core structure including a pair of magnetic circuits in parallel relation, means for inducing an alternating magnetic flux in said magnetic circuits including a winding common thereto, means for inducing a shifting alternating magnetic flux in said magnetic circuits having a frequency double that of the first mentioned alternating flux including a winding on each of said circuits one half of each of which is wound in one direction and the other half is wound in the opposite direction, the resultant of said fluxes being a unidirectional field, means for changing the phase relationship between said fluxes as a function of the amplitude and frequency of the waves to be reproduced, an armature in said unidirectional field, and a wave generating member driven by said armature.

17. In a wave reproducing system, in combination, a magnetic core structure including a pair of magnetic circuits in parallel relation, means for inducing an alternating magnetic flux in said magnetic circuits including a winding common thereto, means for inducing a shifting alternating magnetic flux in said magnetic circuits having a frequency double that of the first mentioned alternating flux including a winding on each of said circuits one half of each of which is wound in one direction and the other half is wound in the opposite direction, the resultant of said fluxes being a unidirectional field, means for changing the phase relationship between said fluxes including a sound wave responsive member and a magnetic member movable in a magnetic field as a function of the amplitude and frequency of the sound waves to effect corresponding change in the position of said unidirectional field, and magnetic means responsive to said unidirectional field for reproducing said sound waves.

18. In a wave transmitting system, in combination, a conducting channel having reactance, means for applying to one end of said channel two alternating currents of different frequencies and bearing a fixed relation to each other, means connected to said channel for shifting the phase of one of said alternating currents to compensate for the reactance of said channel, means at said one end of said channel for shifting the phase of one of said alternating currents with respect to the other as a function of the waves to be transmitted, means at said other end of said channel for generating a unidirectional quantity which varies in accordance with said function, and means responsive to said quantity for reproducing said waves.

19. In a system for communicating between two points, in combination, means providing a channel linking said two points, means providing a plurality of paths along said channel including means for applying thereto at one of said points two or more pairs of alternating currents with the currents of each pair bearing a fixed relation to each other and differing from the currents of the other pair, means at said one point individual to each pair of currents for shifting the phase of one with respect to that of the other as a function of a variable to be transmitted, means at the other point individually responsive to each of said pairs of frequencies for generating a unidirectional quantity which varies in accordance with the corresponding function, and means at said other point responsive to each quantity for reproducing the corresponding variable.

20. In a system for communicating between two points, in combination, means providing a plurality of channels linking said two points, means providing a plurality of paths along each channel including means for applying thereto at one of said points two or more pairs of alternating currents with the currents of each pair bearing a fixed relation to each other and differing from the currents of the other pair, means at said one point individual to each pair of currents for shifting the phase of one with respect to that of the other as a function of a variable to be transmitted, means at the other point individually responsive to each of said pairs of frequencies for generating a unidirectional quantity which varies in accordance with the corresponding function, and means at said other point responsive to each quantity for reproducing the corresponding variable.

21. In a system for communicating between two points, in combination, means providing a channel linking said two points, means providing a plurality of paths along said channel including means for applying thereto at one of said points two or more pairs of alternating currents with the currents of each pair bearing a fixed relation to each other and differing from the currents of the other pair, means at said one point individual to each pair of currents for shifting the phase of one with respect to that of the other as a function of the amplitude and frequency of sound waves to be transmitted, means at the other point individually responsive to each of said pairs of frequencies for generating a unidirectional quantity which varies in accordance with the corresponding function, and means at said other point responsive to each quantity for reproducing the corresponding sound waves.

22. In a system for communicating between two points, in combination, means providing a channel linking said two points, means providing a plurality of paths along said channel including means for applying thereto at one of said points two or more pairs of alternating currents with the currents of each pair bearing a fixed relation to each other and differing from the currents of the other pair, means at said one point individual to each pair of currents for shifting the phase of one with respect to that of the other as a function of the degree of movement of a member to be transmitted, means at the other point individually responsive to each of said pairs of frequencies for generating a unidirectional quantity which varies in accordance with the corresponding function, and means at said other point responsive to each quantity for reproducing the corresponding movement of the respective member.

23. In a system for communicating between two points, in combination, means providing a channel linking said two points, means providing a plurality of paths along said channel including means for applying thereto at one of said points two or more pairs of alternating currents with the currents of each pair bearing a fixed relation to each other and differing from the currents of the other pair, means at said one point individual to certain of said pairs of currents for shifting the phase of one with respect to that of the other as a function of the amplitude and frequency of sound waves to be transmitted, means at said one point individual to certain other of said pairs of currents for shifting the phase of one with respect to that of the other as a function of the degree of movement of a member to be transmitted, means at the other point individually responsive to each of said pairs of frequencies for generating a unidirectional quantity which varies in accordance with the corresponding function, means at the other point responsive to a quantity varying according to sound waves for reproducing the same, and means at the other point responsive to a quantity varying according to a movement for reproducing the same.

References Cited in the file of this patent

UNITED STATES PATENTS

| | | |
|---|---|---|
| 2,269,594 | Mathes | Jan. 13, 1942 |
| 2,402,973 | Moore | July 2, 1946 |
| 2,562,682 | Schmitt | July 31, 1951 |
| 2,582,957 | Borsum et al. | Jan. 22, 1952 |
| 2,648,832 | Johnson | Aug. 11, 1953 |
| 2,676,302 | Webster | Apr. 20, 1954 |
| 2,760,132 | Pawley | Aug. 21, 1956 |